US009013281B2

(12) United States Patent
Vorhies et al.

(10) Patent No.: US 9,013,281 B2
(45) Date of Patent: Apr. 21, 2015

(54) WEARABLE ELECTRONIC SIGNALING DEVICES

(71) Applicants: Zachary James Vorhies, San Francisco, CA (US); Murat Ozkan, San Francisco, CA (US); Roger Fred Challender, San Francisco, CA (US)

(72) Inventors: Zachary James Vorhies, San Francisco, CA (US); Murat Ozkan, San Francisco, CA (US); Roger Fred Challender, San Francisco, CA (US)

(73) Assignee: Zackees, Inc., San Francisco, CA (US)

( * ) Notice: Subject to any disclaimer, the term of this patent is extended or adjusted under 35 U.S.C. 154(b) by 80 days.

(21) Appl. No.: 14/023,459

(22) Filed: Sep. 10, 2013

(65) Prior Publication Data

US 2015/0070162 A1    Mar. 12, 2015

(51) Int. Cl.
*G08C 19/16*    (2006.01)
*A41D 19/00*    (2006.01)
*B60Q 1/34*    (2006.01)

(52) U.S. Cl.
CPC ............ *A41D 19/0024* (2013.01); *B60Q 1/343* (2013.01)

(58) Field of Classification Search
CPC ..... G08C 17/02; F21V 21/08; A41D 19/0024
USPC .................. 340/12.5, 326; 362/103, 109, 276
See application file for complete search history.

(56) References Cited

U.S. PATENT DOCUMENTS

| | | | |
|---|---|---|---|
| 1,046,225 A | 12/1912 | Schindler | |
| 1,165,970 A | 12/1915 | Harris | |
| 4,635,516 A | 1/1987 | Giannini | |
| 6,045,575 A | 4/2000 | Rosen et al. | |
| 6,319,015 B1 | 11/2001 | Faunce | |
| 6,490,402 B1 | 12/2002 | Ota | |
| 6,529,121 B2 | 3/2003 | Bush | |
| 6,592,235 B1 | 7/2003 | Mayo | |
| 7,013,490 B2 | 3/2006 | Senter et al. | |
| 7,210,939 B2 | 5/2007 | Marmaropoulos et al. | |
| 7,556,532 B2 | 7/2009 | Lee et al. | |
| 7,753,685 B2 | 7/2010 | Lee et al. | |
| 8,308,489 B2 | 11/2012 | Lee et al. | |
| 2004/0255361 A1 | 12/2004 | Senter et al. | |
| 2006/0283691 A1 | 12/2006 | Chang et al. | |
| 2007/0188427 A1 | 8/2007 | Lys et al. | |
| 2010/0048066 A1 | 2/2010 | Bertsch et al. | |

(Continued)

FOREIGN PATENT DOCUMENTS

GB    2422527 A    2/2006

OTHER PUBLICATIONS

McNicoli et al., The laser light that could cut cyclist deaths, CNN Tech, 2013.

(Continued)

*Primary Examiner* — Tai T Nguyen
(74) *Attorney, Agent, or Firm* — Robert Moll (57) ABSTRACT

This invention relates to electronic wearable articles such as clothing. The invention is an integrated wearable article (e.g. an electronic glove) that allows a user to signal to others the user intent for direction. The electronic glove includes a glove, a chevron-shaped light integrated with the glove that points away from the user when glove is on the hand of the user to indicate intended direction, and an electronic circuit including a switch mechanism with a first contact assembly on the thumb and a second contact assembly on the index finger of the glove, wherein the electronic circuit detects when the first contact assembly touches the second contact assembly to actuate the light, and a battery to power the electronic circuit.

5 Claims, 6 Drawing Sheets

(56) References Cited

U.S. PATENT DOCUMENTS

| | | | |
|---|---|---|---|
| 2010/0100997 A1 | 4/2010 | Lee et al. | |
| 2010/0253501 A1 | 10/2010 | Gibson | |
| 2011/0078842 A1* | 4/2011 | Tang | 2/160 |
| 2011/0157873 A1 | 6/2011 | English | |
| 2011/0310593 A1* | 12/2011 | Lee et al. | 362/103 |
| 2012/0069552 A1 | 3/2012 | Richter | |
| 2013/0169420 A1* | 7/2013 | Blount, Jr. | 340/12.5 |
| 2013/0258644 A1* | 10/2013 | Comunale et al. | 362/103 |

OTHER PUBLICATIONS

Posch, Early Winter Biking Gloves : Irene Posch, http://www.ireneposch.net/index.php?/arttech/early-winter-night-biking-gloves/, 2010-2013.

PCT/US2014/054439 Written Opinion of the International Searching Authority dated Feb. 4, 2015.

PCT/US2014/054439 International Search Report dated Feb. 4, 2015.

PCT/US2014/054439 Search History dated Jan. 23, 2015.

* cited by examiner

WEARABLE ELECTRONIC SIGNALING DEVICES

BACKGROUND

This invention relates to electronic wearable articles. A significant reason people do not ride their bikes more often, particularly in urban areas with heavy traffic, is the fear of death or bodily harm from vehicle collisions. Because cyclists and vehicles share the road, it is important for drivers to understand where the cyclist is heading next. When a cyclist is turning left or right, he or she can indicate this by hand signals. However, not all drivers may recall the hand signaling rules and thus may not understand the rider's intent. Hand signals also suffer because they do not grab attention and from the fact they are not visible at night. Of course, this problem of signaling exists for skateboarders, runners, and roller skaters as well. There exists a need to quickly and clearly signal to vehicles that share the road with users (e.g., riders and runners) intent for direction.

SUMMARY OF THE INVENTION

This invention relates to electronic wearable articles. In a feature, the invention is integrated with an electronic wearable article, e.g. a glove or set of gloves, that allows a user to signal to others the user's intent for direction. In one aspect, the electronic glove includes a glove, a chevron-shaped light integrated with the glove that points away from the user when the glove is on the hand of the user to indicate intended direction, and an electronic circuit including a switch mechanism with a first contact assembly on the thumb and a second contact assembly on the index finger of the glove, wherein the electronic circuit detects when the first contact assembly touches the second contact assembly to actuate the light, and a battery to power the electronic circuit.

In a feature of the invention, the switch mechanism includes a first contact assembly including a first conductive plate with a first shaft, a first ring terminal disposed on the first shaft, a first stranded wire connected to the first ring terminal, a second conductive plate with a first hole mated with the first shaft, wherein the first ring terminal contacts either the first conductive plate or the second conductive plate or both of the first and second conductive plates, a second contact assembly including a third conductive plate with a second shaft, a second ring terminal disposed on the second shaft, a second stranded wire connected to the second ring terminal, and a fourth conductive plate with a second hole mated with the second shaft, wherein the second ring terminal contacts either the third conductive plate or the fourth conductive plate or both of the third and fourth conductive plates, wherein the first and the second contact assemblies make contact to actuate the switch mechanism.

In a feature of the invention, the contact assembly includes a first conductive plate with a shaft, a ring terminal disposed on the shaft, a stranded wire connected to the ring terminal, and a second conductive plate with a hole mated with the shaft, wherein the ring terminal contacts either the first conductive plate or the second conductive plate or both of the first and second conductive plates.

DETAILED DESCRIPTION OF PREFERRED EMBODIMENTS

The following description includes the best mode of carrying out the invention, illustrates the principles of the invention, uses illustrative values, and should not be taken in a limiting sense. The scope of the invention is determined by reference to the claims. Each part or step is assigned its own number in the specification and drawings. The drawings are not to scale and do not reflect the relative size.

Figure 1A:
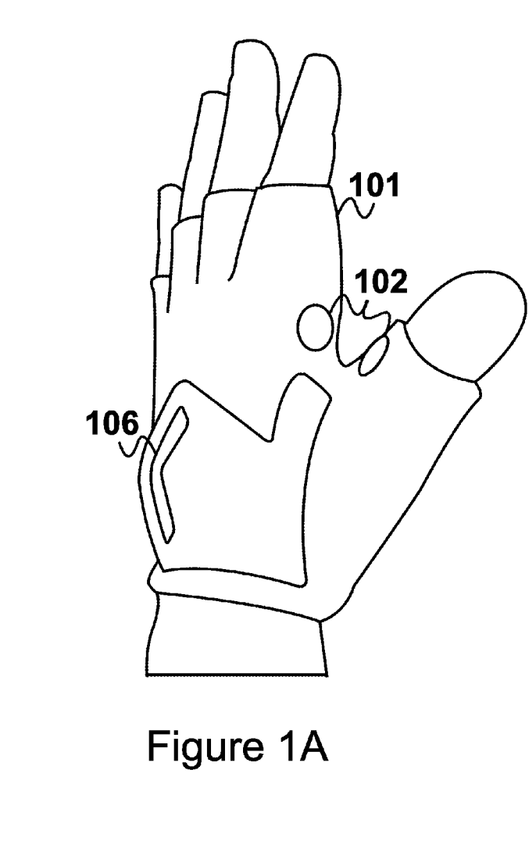
FIG. 1A is a perspective view of a left-handed electronic glove.

FIG. 1A is a perspective view of an embodiment of a left-handed electronic glove. As shown in FIG. 1A, electronic glove 101 includes a chevron shaped light 106 activated by switch mechanism 102 integrated with the electronic glove 101 so that the chevron-shaped light 106 points away from the user when electronic glove 101 is on the hand to indicate the intended direction. Similarly, FIG. 1B includes chevron-shaped light 104, switch mechanism 103 integrated in the right-handed electronic glove 105.

Figure 1B:
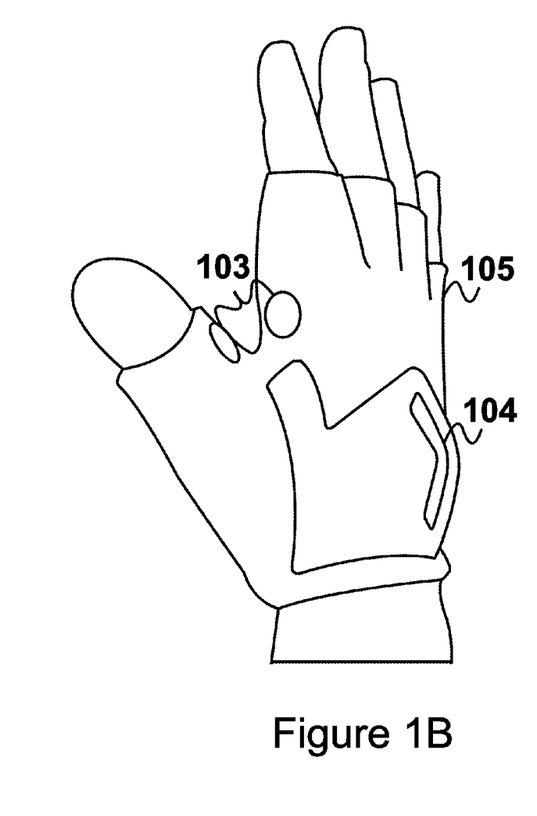
FIG. 1B is a perspective view of a right-handed electronic glove.
Figure 2A:
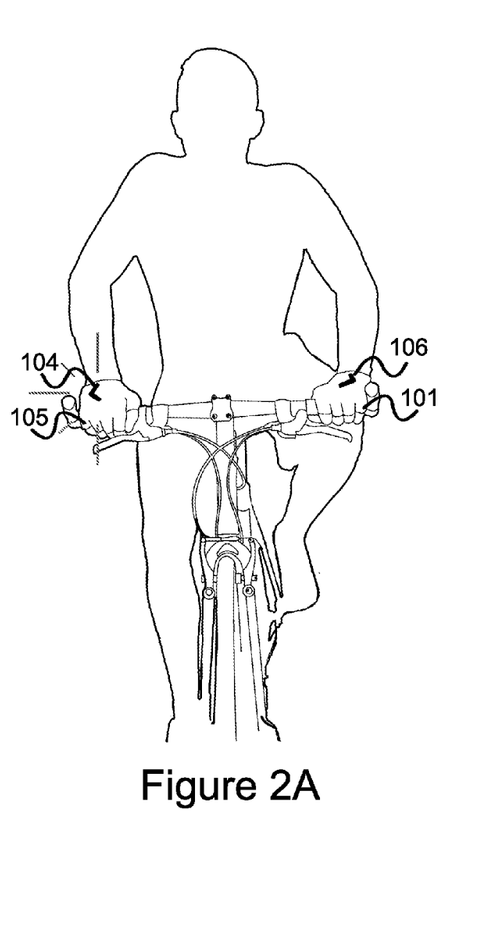
FIG. 2A illustrates the right-handed electronic glove of FIG. 1B with the chevron-shaped light 104 signaling persons in front of the user.

FIG. 2A illustrates the right-handed electronic glove of FIG. 1B with the chevron-shaped light 104 signaling persons in front of the user.

Figure 2B:
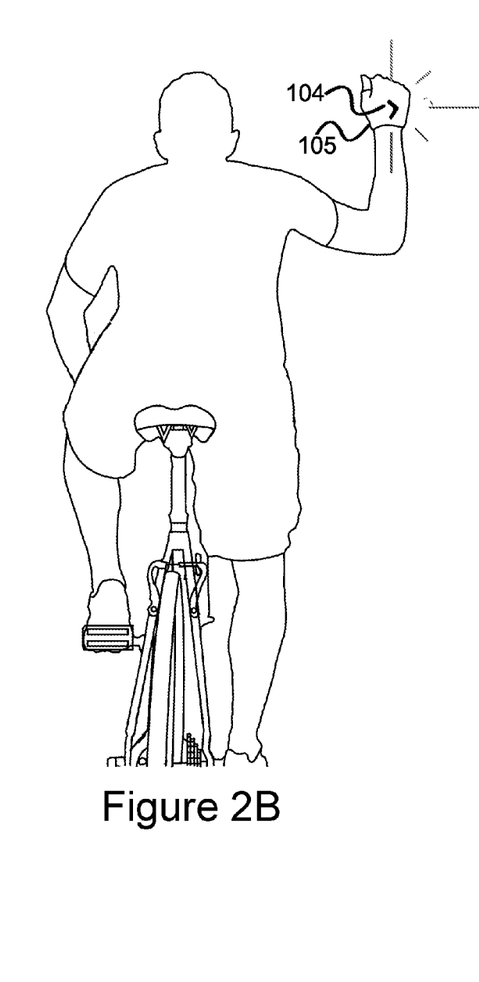
FIG. 2B illustrates the right-handed electronic glove of FIG. 1B with the chevron shaped light 104 signaling persons in back of the user.

FIG. 2B illustrates the right-handed electronic glove of FIG. 1B with the chevron-shaped light 104 to signal persons in back of the user.

The chevron-shaped light 106 of the left-handed glove 101 can be used in similar fashion.

Figure 3:
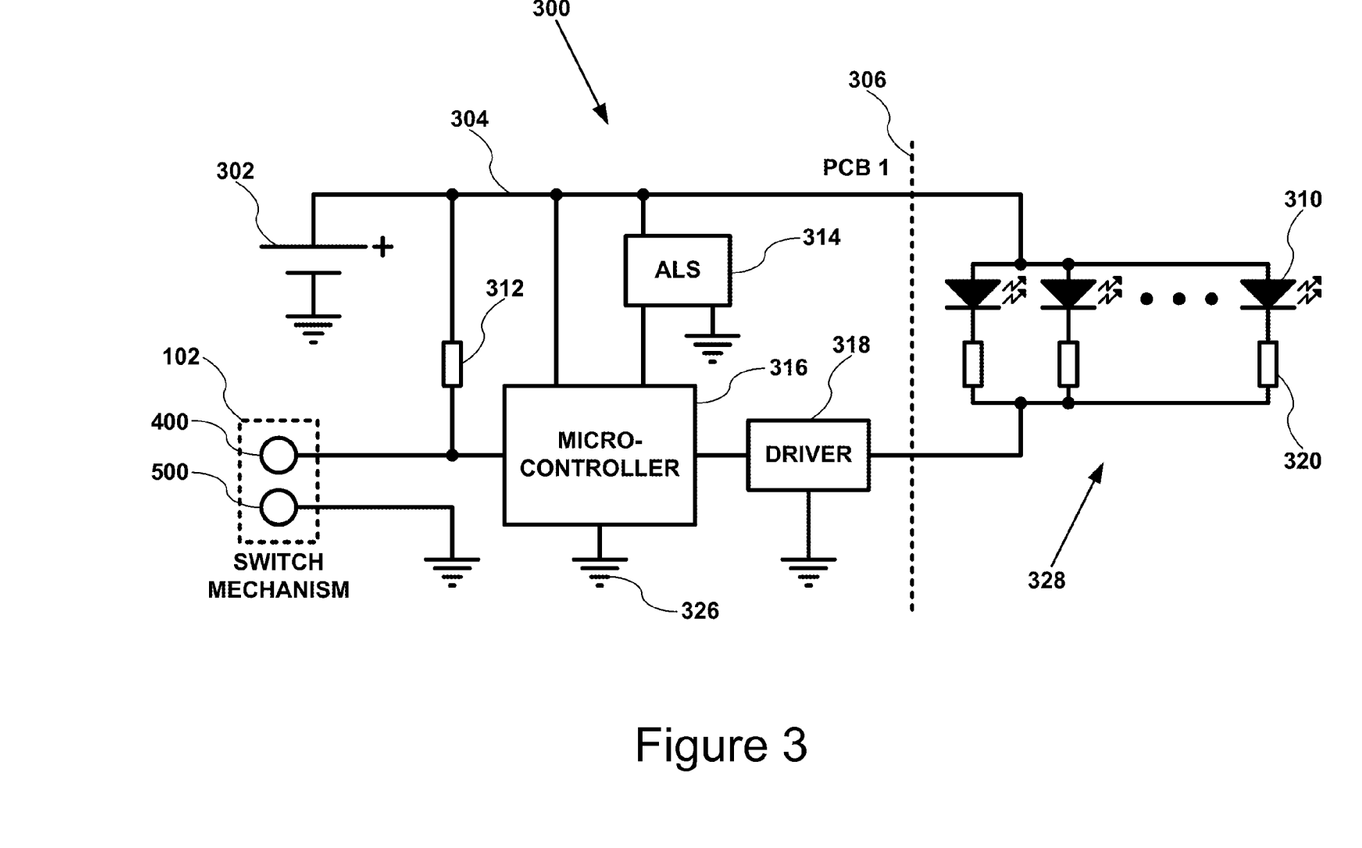
FIG. 3 is a schematic of an embodiment of the electronic circuit suitable for use in the electronic glove.

FIG. 3 is a schematic of an embodiment of the electronic circuit for use in the electronic gloves 101, 105. The electronic circuit 300 includes a battery 302 which provides a power supply rail 304 and a ground reference 326 for the electronic circuit 300. The behavior of the electronic circuit 300 is driven by the microcontroller unit (MCU) 316 which contains in one IC package, a central processor unit, non-volatile program memory, volatile memory for data, and a range of I/O peripherals to interact with external system components (not shown). A suitable MCU is part number PIC12LF1840 from Microchip Technology Inc. in Chandler, Ariz. When using part number PIC12LF1840 as the MCU 316, we connect a digital input capable pin of the MCU 316 to the switch mechanism 102 consisting of two contact assemblies 400, 500 that form the two contacts of the switch mechanism 102. The contact assembly 400 connected to the input pin of the MCU 316 is pulled up to the power supply rail 304 through a resistor 312 suitably sized (e.g., 10 k ohms) to allow the voltage level to drop below the logic low threshold (V_IL) of the MCU input pin when the switch mechanism 102 is closed.

The ambient light sensor (ALS) 314 includes a transducer in an IC package and supporting circuitry to convert light incident on the transducer's IC package into an electrical signal capable of being read by the MCU 316. One suitable ALS is part number SFH 5711 manufactured by Osram GmbH in Munich, Germany. In an embodiment of the electronic circuit 300, the ALS 314 is routed to a pin (not shown) of the MCU 316 that is capable of being an input to the analog-to-digital converter (not shown) of the MCU 316. In this embodiment, the light assembly 328 that constitutes the illuminated chevron light includes light emitting diodes such as LED 310 with a current limiting resistor 320.

In an embodiment, the light assembly 328 is a variable number of parallel-connected light emitting diodes 310 and current limiting resistors 320. A suitable LED is part number APTD3216SYCK from Kingbright Inc. in City of Industry, California. A suitable current limiting resistor 320 is 49.9 ohms. In an embodiment, a lithium coin cell battery powers eleven light emitting diodes 310. The driver circuit 318 for the light assembly 328 is an electronically controllable switch capable of passing the current demanded by the light assembly 328 such as an N-channel MOSFET with its gate connected to an output-capable I/O pin of the MCU 316. A suitable N-channel MOSFET is part number DMG1013UW-7 manufactured by Diodes Inc in Plano, Tex.

FIG. 3 illustrates the electronic circuit 300 can be implemented for mechanical flexibility of the wearable article on two printed circuit boards as indicated to the left and right side of the dotted line 306.

Figure 4A:
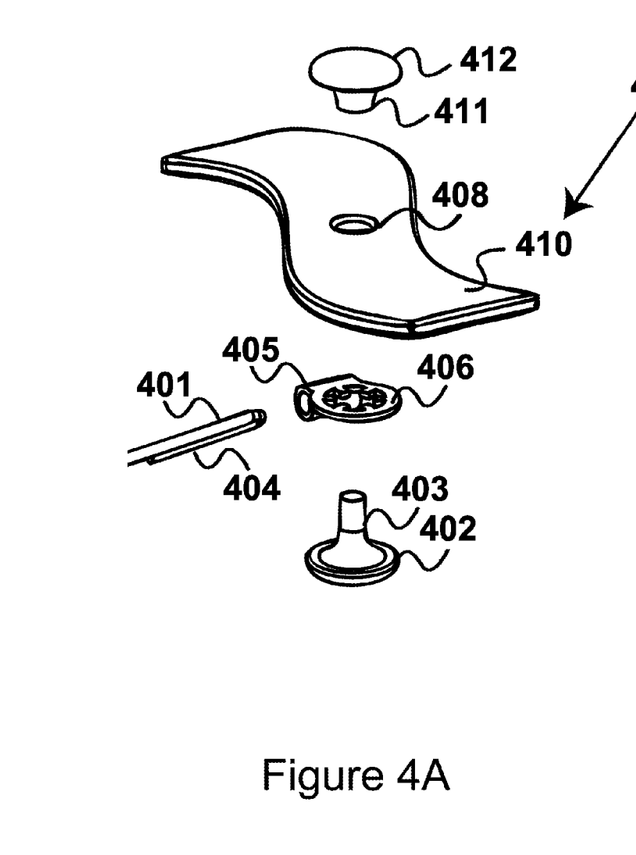
FIG. 4A is an exploded view of the contact assembly and a portion of the electronic wearable article.

FIG. 4A is an exploded view of the contact assembly and a portion of the electronic wearable article (e.g., glove). As shown, the contact assembly 400, includes a third conductive plate 402 with a shaft 403 inserted in a second ring terminal 406 and a hole 408 in a portion 410 of the electronic wearable article, a stranded wire 401 connected to the second ring terminal 406, and a fourth conductive plate 412 with a hole 411 to mate with the shaft 403.

The stranded wire 401 is defined as a collection of electrically conductive wires, made of copper or tinned copper, where each individual strand measuring 0.3 mm or less in diameter, is bundled together to form a larger wire. This bundle of wire can be straight, parallel, twisted or braided strands.

In other embodiments, the stranded wire can be made of copper, silver, tin, gold, aluminum, nickel or a combination of those as coatings or mixed together alloys. The wire bundled is sheathed in an electrical insulation comprising of Silicon, polyvinyl chloride, polytetrafluoroethylene or equivalent.

Figure 4B:
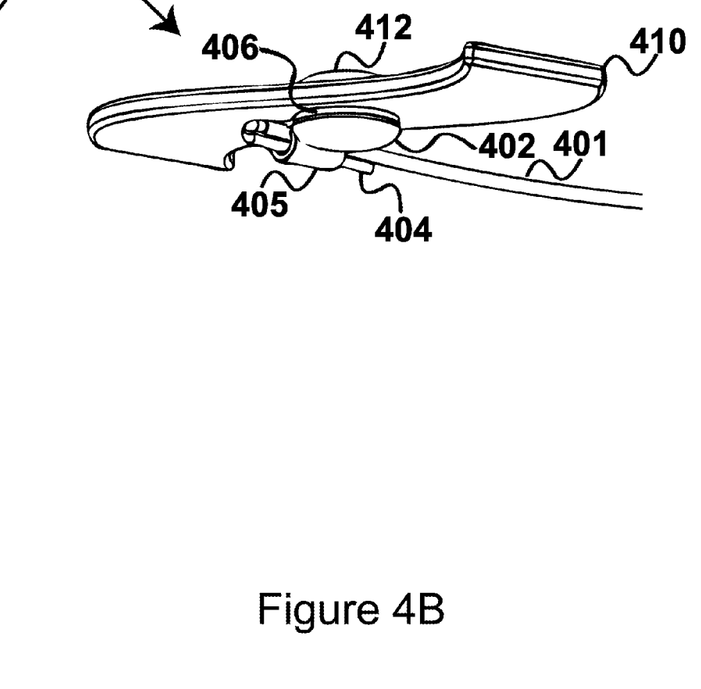
FIG. 4B is a view of the contact assembly integrated with the electronic wearable article.

FIG. 4B is a view of the fully assembled contact assembly integrated with the electronic wearable article. In an embodiment, we strip the insulation from the end of stranded wire 401 at exposed portion 404, bend the wire strands back over the insulated part of the stranded wire 401 and this is inserted into a barrel 405 of the second ring terminal 406 to ensure good electrical contact between the exposed portion 404 of the stranded wire 401 and the second ring terminal 406. In an embodiment, the bent back portion of the exposed portion 404 of the stranded wire is disposed in the barrel 405 of the second ring terminal 406. The barrel 405 is crimped down to secure the stranded wire 401 to the second ring terminal 406.

In another embodiment, conductive adhesive (e.g. epoxy) or solder is used to secure the stranded wire 401 to the second ring terminal 406.

When assembled, the second ring terminal 406 contacts either the third conductive plate 402 or the fourth conductive plate 412 or both of the conductive plates 402 and 412. Further, the stranded wire 401, the second ring terminal 406, and the third conductive plate 402 are on the inside of the electronic wearable article, leaving only the top conductive plate exposed to view.

Figure 5A:
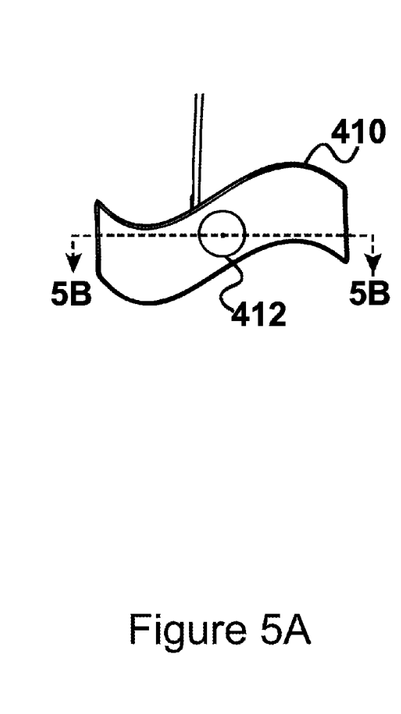
FIG. 5A is a top view of the switch mechanism exposed in the electronic wearable article.
Figure 5B:
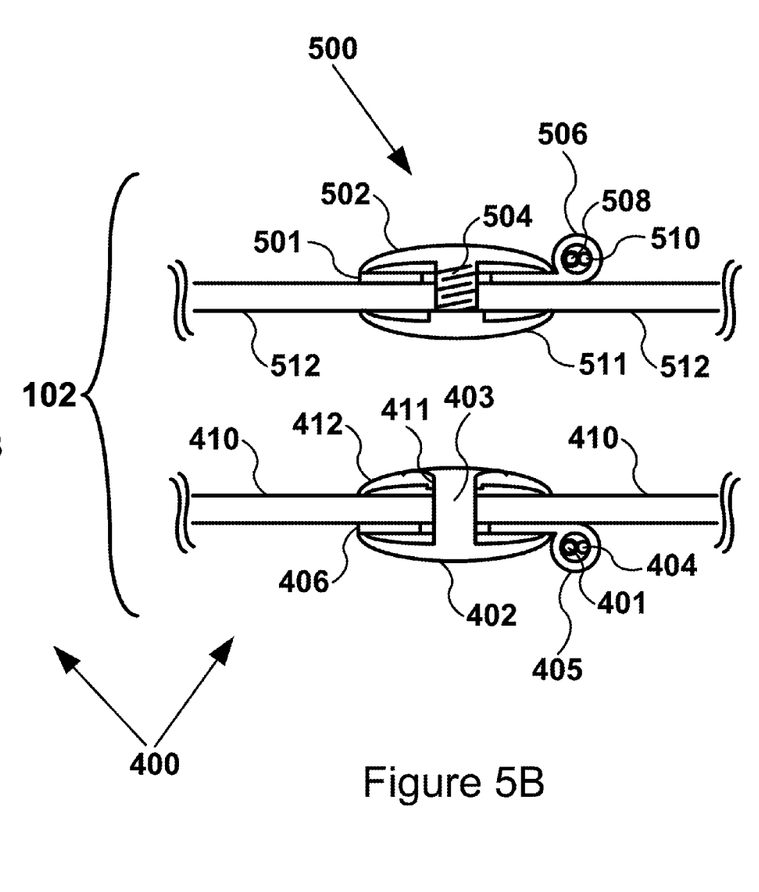
FIG. 5B is a cross-sectional view through line 5B-5B of the switch mechanism in FIG. 5A.

FIG. 5A is a top view of the exposed part of the switch mechanism that is integrated in the electronic wearable article. It also indicates a cross-section through line 5B-5B.

FIG. 5B is the cross-sectional view through a line 5B-5B of an embodiment of the switch mechanism. The switch mechanism 102 includes a first contact assembly 500 and a second contact assembly 400.

The first contact assembly 500 includes a first conductive plate 502 with a first shaft 504, a first ring terminal 501 disposed on the first shaft 504, an exposed portion 510 of a first stranded wire 508 inside the barrel 506 of the first ring terminal 501, a second conductive plate 511 with a first hole (not shown) mated with the first shaft 504, wherein the first ring terminal 501 contacts the first conductive plate 502 or the second conductive plate 511 or both of the conductive plates 502, 511. As shown, the first shaft 504 extends through a hole in a portion 512 of the electronic wearable article.

The second contact assembly 400 includes a third conductive plate 402 with a second shaft 403, a second ring terminal 406 disposed on the second shaft 403, a second stranded wire 401 with an exposed portion 404 of second stranded wire 401 inside the barrel 405 of the second ring terminal 406, a fourth conductive plate 412 with a second hole 411 mated with the second shaft 403, wherein the second ring terminal 406 contacts either the third conductive plate 402 or the fourth conductive plate 412 or both of the conductive plates 402, 412, wherein the first and the second contact assemblies 400, 500, make physical contact to actuate the switch mechanism 102.

Figure 6A:
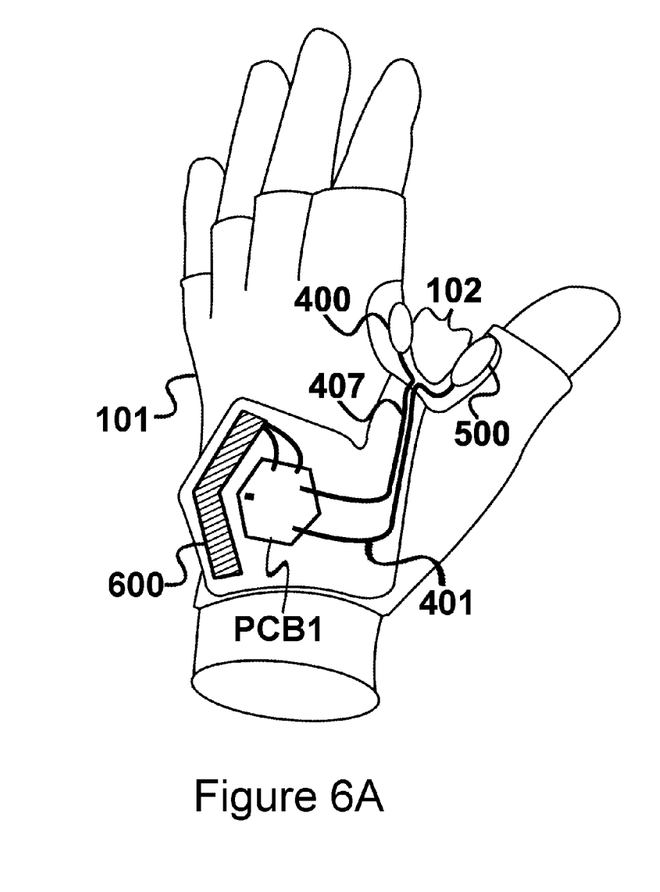
FIG. 6A illustrates the left-handed electronic glove with a cutaway to show the switch mechanism coupled with stranded wires to the electronic circuit and a chevron-shaped light.

FIG. 6A illustrates the left-handed electronic glove 101 with a cutaway to show the switch mechanism 102 of the contact assemblies 400, 500 coupled by the stranded wires 401, 407 to the electronic circuit PCB1 and an illuminated light surface 600 that define the chevron-shaped light.

Figure 6B:
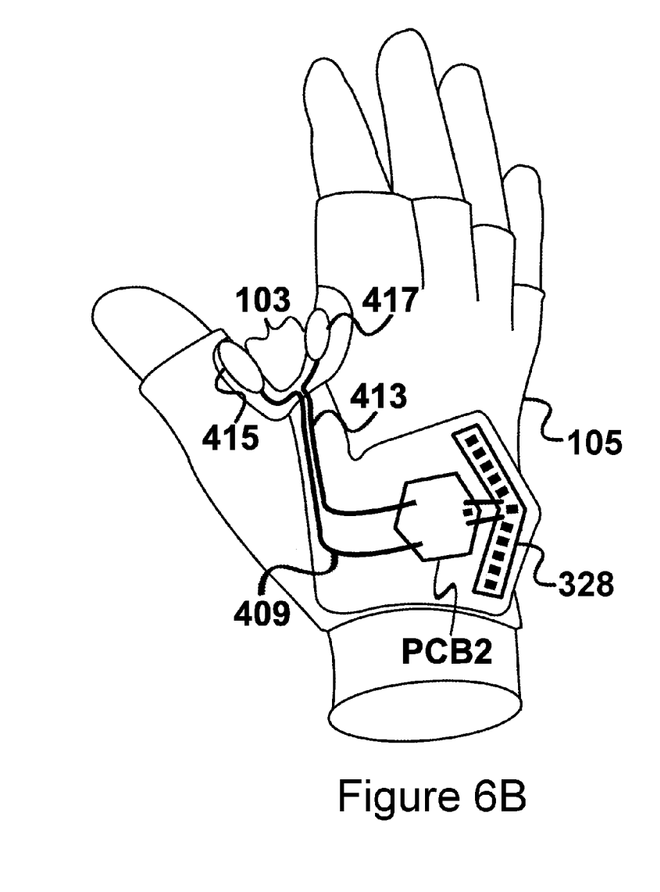
FIG. 6B illustrates the right-handed electronic glove with a cutaway to show the switch mechanism coupled with stranded wires to the electronic circuit and a chevron-shaped light.

FIG. 6B illustrates the right-handed electronic glove 105 with a cutaway to show the switch mechanism 103, which has the same construction as switch mechanism 102 of contact assemblies 415, 417, which has the same construction as contact assemblies 400, 500 coupled by the stranded wires 409, 413 to the electronic circuit PCB2 and an array of discrete point sources of light 328 that define the chevron-shaped light.

We claim:
1. An electronic glove for a user, comprising:
a glove;
a chevron-shaped light integrated with the glove to point away from the user when glove is on the hand of the user to indicate intended direction;
an electronic circuit including a switch mechanism with a first contact assembly on a thumb and a second contact assembly on an index finger of the glove, wherein the electronic circuit detects when the first contact assembly touches the second contact assembly to actuate the chevron-shaped light; and
a battery to power the electronic circuit;
wherein the switch mechanism comprise:
a first contact assembly including:
a first conductive plate with a first shaft;

a first ring terminal disposed on the first shaft;
a first stranded wire connected to the first ring terminal;
a second conductive plate with a first hole mated with the first shaft, wherein the first ring terminal contacts either the first conductive plate or the second conductive plate or both of the first and second conductive plates;
a second contact assembly including:
a third conductive plate with a second shaft;
a second ring terminal disposed on the second shaft;
a second stranded wire connected to the second ring terminal; and
a fourth conductive plate with a second hole mated with the second shaft, wherein the second ring terminal contacts either the third conductive plate or the fourth conductive plate or both of the third and fourth conductive plates, wherein the first and the second contact assemblies make contact to actuate the switch mechanism.

2. The electronic glove of claim 1, wherein the chevron-shaped light comprises an array of discrete point sources of light.

3. The electronic glove of claim 1, wherein the chevron-shaped light comprises a contiguous illuminated surface.

4. The electronic glove of claim 1, wherein the electronic circuit includes a microcontroller electrically coupled to the switch mechanism, an ambient light sensor, a light driver circuit, wherein the microcontroller adjusts the light driver circuit to adjust an intensity of the chevron-shaped light based on the ambient light detected by the ambient light sensor.

5. The electronic glove of claim 1, wherein the electronic circuit includes a microcontroller electrically coupled to the switch mechanism, a light driver circuit, wherein the microcontroller manages the timing of an on-off cycle of the chevron-shape light when the switch mechanism is closed to actuate the chevron-shaped light.

* * * * *